US011933473B2

(12) United States Patent
Menoret et al.

(10) Patent No.: US 11,933,473 B2
(45) Date of Patent: Mar. 19, 2024

(54) ELEMENT OF A VEHICLE LUMINOUS DEVICE WITH AN ANGLED PORTION (71) Applicant: Valeo Vision, Bobigny (FR)

(72) Inventors: Romain Menoret, Bobigny (FR); Jean-Marc Gressot, Bobigny (FR); Elie Bosc, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/783,823

(22) PCT Filed: Dec. 14, 2020

(86) PCT No.: PCT/EP2020/086054
§ 371 (c)(1),
(2) Date: Jun. 9, 2022

(87) PCT Pub. No.: WO2021/116499
PCT Pub. Date: Jun. 17, 2021

(65) Prior Publication Data
US 2023/0003359 A1 Jan. 5, 2023

(30) Foreign Application Priority Data
Dec. 13, 2019 (FR) ...................................... 1914430

(51) Int. Cl.
F21S 43/20 (2018.01)
B29C 45/00 (2006.01)
(Continued)

(52) U.S. Cl.
CPC .......... *F21S 43/26* (2018.01); *B29C 45/0001* (2013.01); *B29C 45/0046* (2013.01);
(Continued)

(58) Field of Classification Search
CPC .. F21S 43/26; B29C 45/0001; B29C 45/0046; B29C 45/1642
See application file for complete search history.

(56) References Cited

U.S. PATENT DOCUMENTS 11,104,112 B2 * 8/2021 Weissenberger ...... B32B 37/025
2012/0326354 A1 * 12/2012 Desmazieres .......... B29C 45/56
425/577
(Continued)

FOREIGN PATENT DOCUMENTS

DE 102007052197 A1 4/2009

OTHER PUBLICATIONS

European Patent Office, International Search Report (with English translation) and Written Opinion of corresponding International Application No. PCT/EP2020/086054, dated Mar. 11, 2021.

Primary Examiner — Christopher E Dunay
(74) Attorney, Agent, or Firm — Valeo Vision (57) ABSTRACT The invention relates to an element of a vehicle luminous device, including an element made from a synthetic polymer material and includes an injection space which is formed by a primary space and a secondary space. The element further includes a material injection channel with at least two portions which extend in different directions. A first portion includes an injection location and a second portion is connected to the secondary space, and at least one angled portion with a variable angle connecting the at least two portions and including a protuberance.

18 Claims, 6 Drawing Sheets (51) Int. Cl.
*B29C 45/16* (2006.01)
*B29L 9/00* (2006.01)
*B29L 11/00* (2006.01)

(52) U.S. Cl.
CPC .. B29C 45/1642 (2013.01); *B29K 2995/0026* (2013.01); *B29L 2009/00* (2013.01); *B29L 2011/00* (2013.01)

(56) References Cited

U.S. PATENT DOCUMENTS

| | | | |
|---|---|---|---|
| 2013/0100690 A1* | 4/2013 | Dereani | B29C 45/0025 |
| | | | 264/1.7 |
| 2018/0162028 A1* | 6/2018 | Han | B29C 45/0003 |
| 2019/0249844 A1* | 8/2019 | Sugiyama | F21S 43/26 |
| 2019/0358875 A1 | 11/2019 | Fukuzawa | |
| 2020/0270444 A1* | 8/2020 | Lin | G02B 1/041 |
| 2021/0023754 A1* | 1/2021 | Wodak | B29C 45/2701 |
| 2023/0043893 A1* | 2/2023 | Brinkmeier | B29C 45/14 |

* cited by examiner

ELEMENT OF A VEHICLE LUMINOUS DEVICE WITH AN ANGLED PORTION

CROSS-REFERENCE TO RELATED APPLICATIONS

This application is filed under 35 U.S.C. § 371 U.S. National Phase of International Application No. PCT/EP2020/086054 filed Dec. 14, 2020 (published as WO2021116499), which claims priority benefit to French application No. 1914430 filed on Dec. 13, 2019, the disclosures of which are herein incorporated by reference in their entirety.

TECHNICAL FIELD

The present invention relates to an element of a vehicle luminous device. It is particularly applicable, but not limited, to motor vehicles.

BACKGROUND OF THE INVENTION

An element of a motor vehicle luminous device, known to those skilled in the art, such as an intermediate screen of a position light comprises an injection volume formed of a primary volume and a secondary volume. One of the volumes is smaller than the other. They each have an injection point through which material has been injected to form two parts of said element. A sequential injection process is used in which material is injected by means of a nozzle via the first injection point to fill the primary volume, then material is injected by means of the same nozzle via the second injection point to fill the smaller secondary volume, at the same time as the injection of the primary volume ends. The injection points are opened sequentially one after the other to inject the material.

A drawback of this prior art is that an overpressure occurs at the level of the nozzle during the filling of the secondary volume with the material, which creates a problem of so-called frosting which is transmitted around the second injection point and in a part of the secondary volume. Besides the problem of frosting, whitish halos may also appear around this second injection point.

BRIEF SUMMARY OF THE INVENTION

In this context, the present invention aims to propose an element of a vehicle luminous device which also makes it possible to solve the drawback mentioned.

To this end, the invention proposes an element of a vehicle luminous device made of synthetic polymer material and comprising an injection volume formed of a primary volume and a secondary volume, characterized in that said element further comprises a material injection channel comprising:
- at least two parts extending respectively in different directions, of which a first part comprises an injection point and a second part is connected to said secondary volume,
- at least one bend of variable angle connecting said at least two parts and comprising a protuberance.

Thus, as will be seen in detail below, the protuberance will make it possible to trap the volume of material which undergoes the overpressure during the second injection, this volume of material cooling while the rest of the material continues to flow in the other part of the injection channel. The volume of material remains stored in the protuberance. After the change of direction defined by the bend, the flow pressure of the material is more homogeneous, without overpressure in the secondary volume of the element.

According to nonlimiting embodiments, the element of a vehicle luminous device may also comprise one or more additional features taken alone or according to all the technically possible combinations, among the following.

According to one nonlimiting embodiment, said at least one bend comprises an angle of approximately 90°.

According to one nonlimiting embodiment, said at least one bend is rounded or has a sharp angle.

According to one nonlimiting embodiment, said injection point is configured to perform an injection substantially perpendicular to the plane of said element.

According to one nonlimiting embodiment, said primary volume and said secondary volume are separated or edge to edge.

According to one nonlimiting embodiment, said protuberance has a trapezoidal or hemispherical or rectangular cross section.

According to one nonlimiting embodiment, said material injection channel is overmolded.

According to one nonlimiting embodiment, said element is composed of one or more layers.

According to one nonlimiting embodiment, said element is composed of three layers According to one nonlimiting embodiment, one of the three layers is opaque and another of the three layers is transparent.

According to one nonlimiting embodiment, said element is an intermediate screen.

According to one nonlimiting embodiment, said element is made of PMMA or PC.

According to one nonlimiting embodiment, said element comprises two bends.

According to one nonlimiting embodiment, said material injection channel comprises more than two parts.

According to one nonlimiting embodiment, said material injection channel comprises more than one bend.

According to one nonlimiting embodiment, said material injection channel comprises two bends.

A vehicle luminous device is also proposed, wherein said luminous device comprises at least one light source, an optical element, a transparent outer output lens and an element according to any one of the preceding features.

According to one nonlimiting embodiment, said element is an intermediate screen arranged between said optical element and said transparent outer output lens.

According to one nonlimiting embodiment, said luminous device is a position light.

BRIEF DESCRIPTION OF THE DRAWINGS

The invention and its various applications will be better understood upon reading the following description and with reference to the accompanying figures, in which.

DETAILED DESCRIPTION OF THE INVENTION

Elements that are identical, in structure or in function, and that appear in different figures keep the same reference signs, unless specified otherwise. The elements have been represented without respect to scale.

The element 1 of a vehicle luminous device 2 according to the invention is described with reference to FIGS. 1 to 5. In one nonlimiting embodiment, the vehicle is a motor vehicle. The term motor vehicle is understood to mean any type of motorized vehicle. This embodiment is taken as a nonlimiting example throughout the remainder of the description. Throughout the remainder of the description, the vehicle is thus also called a motor vehicle.

In one nonlimiting embodiment, the luminous device 2 is a position light T called a tail light. In one nonlimiting embodiment, the luminous device 2 further performs a signaling function TI, otherwise called an indicating function, the device being called a turn indicator. In one nonlimiting embodiment illustrated in FIG. 2, the signaling function TI is centered between two parts 11 and 10 of the luminous device 2, the two parts making it possible to perform the position function T.

Figure 1:
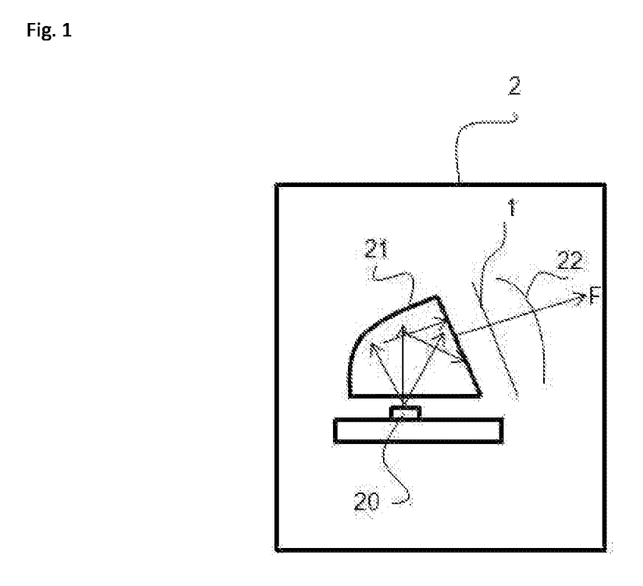
FIG. 1 illustrates a diagram of a vehicle luminous device, said luminous device comprising at least one light source, an optical element, an outer output lens, and an element arranged between said optical element and said outer output lens, according to one nonlimiting embodiment of the invention.

As illustrated in FIG. 1, the luminous device 2 comprises at least one light source 20, an optical element 21 such as, in nonlimiting examples, a reflector, a light guide or a lens, said element 1, and a transparent outer output lens 22. The optical element 21 is configured to generate a light beam F from light rays R emitted by the light source 20, said light beam F illuminating said element 1.

Figure 2:
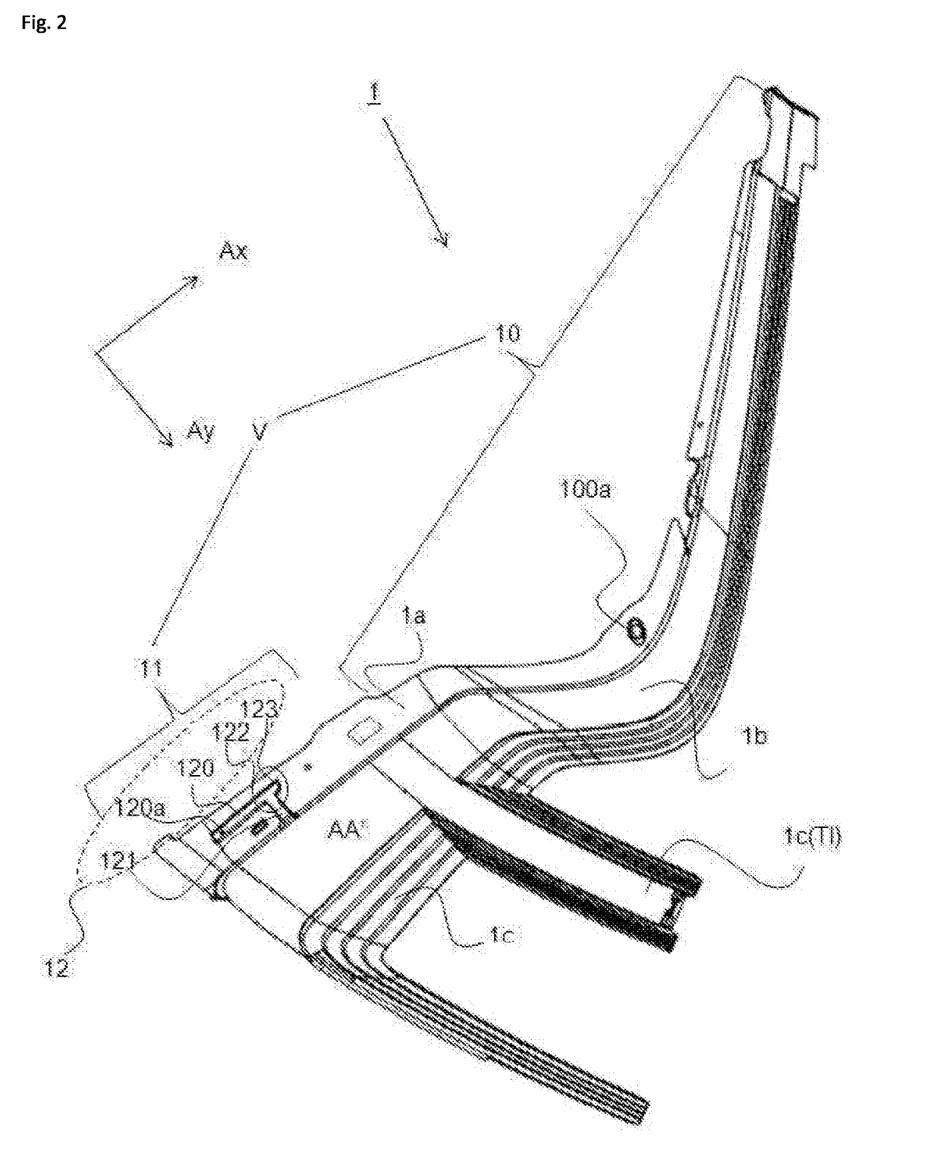
FIG. 2 shows a perspective view of said element of the luminous device of FIG. 1, said element comprising a primary volume, a secondary volume, a material injection channel comprising at least two parts and a bend connecting the two parts, said bend comprising a protuberance, according to a first nonlimiting embodiment of the invention.

In one nonlimiting embodiment, said element 1 is an intermediate screen arranged between said optical element 21 and said outer output lens 22. Said element 1 is thus backlit by the light beam F generated by the optical element 21. As illustrated in FIG. 2, the element 1 is made up of three layers, otherwise known as stations. In one nonlimiting embodiment, a first layer 1a is opaque (otherwise called opaque layer 1a), a second layer 1b is of opaline color (otherwise called opaline color layer 1b), and a third layer 1c is transparent. This last layer 1c is also called crystal layer 1c. The first layer 1a is in a nonlimiting example of black color, which makes it possible to have an esthetic function.

In one nonlimiting embodiment, the element 1 is made of synthetic polymer. In one nonlimiting embodiment, the synthetic polymer is PMMA (polymethyl methacrylate) or PC (polycarbonate). Owing to the production in three layers, in one nonlimiting embodiment, three different injections are used to produce the three layers. It will be noted that the signaling function TI is located in the third layer 1c.

As illustrated in FIG. 2, said element 1 comprises an injection volume V formed by a primary volume 10 and a secondary volume 11 which thus each define a part of the luminous device 2 to perform the position function T. In a first nonlimiting embodiment illustrated in the figures, the primary volume 10 and the secondary volume 11 are separated. In the nonlimiting example, they are separated by part of the crystal layer 1c. This part of the crystal layer 1c also makes it possible to perform the signaling function TI. In a second nonlimiting embodiment that is not illustrated, the primary volume 10 and the secondary volume 11 are not separated. They are edge to edge.

In one nonlimiting embodiment, the primary volume 10 is approximately five times larger than the secondary volume 11. The element 1 comprises a first injection point for the primary volume 10 and a second injection point for the secondary volume 11. Material is injected first into the primary volume 10, then second into the secondary volume 11. Both injections end at the same time. The primary volume 10 thus comprises an injection point 100a (otherwise called the first injection point 100a), and the secondary volume 11, which is smaller, thus comprises an injection point 120a (otherwise called the second injection point 100a). The first injection point 100a makes it possible to start an injection of material before an injection of material via the second injection point 120a. The injection of material via the first injection point 100a does not create any appearance defect, such as frosting. The injection of material via the second injection point 120a creates an appearance defect, such as frosting, which will be trapped in a protuberance 123 of a material injection channel 12 described below. The material injection channel 12 is linked to the secondary volume 11, therefore to the smallest volume of the element 1.

As illustrated in FIG. 2, FIG. 3a, FIG. 3b, FIG. 4, and FIG. 5, said element 1 further comprises a material injection channel 12 configured to inject material into the secondary volume 11. The material injection channel 12 comprises:

at least two parts 120, 121 extending respectively in different directions Ax, Ay, of which a first part 120 comprises an injection point 120a and a second part 121 is connected to said secondary volume 11, at least one bend 122 of variable angle a connecting said at least two parts 120, 121 and comprising a protuberance 123.

As illustrated in FIG. 3a, FIG. 3b, FIG. 4, and FIG. 5, the material injection channel 12 further comprises an injection threshold 120b which defines the transition zone between the material injection channel 12 and the secondary volume 11, in particular the visible part which is not hidden by the first layer 1b.

Figure 3A:
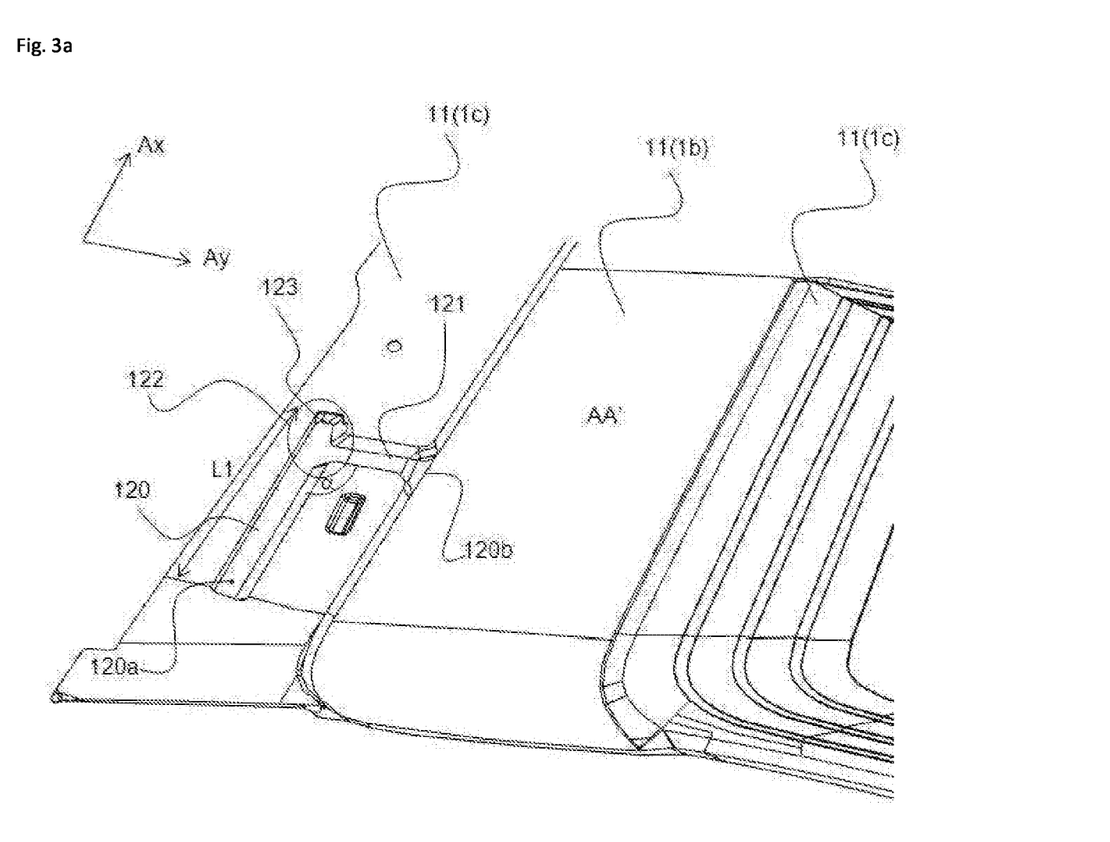
FIG. 3a shows a view of the material injection channel of FIG. 2 according to a first nonlimiting embodiment, said material injection channel being not overmolded.
Figure 3B:
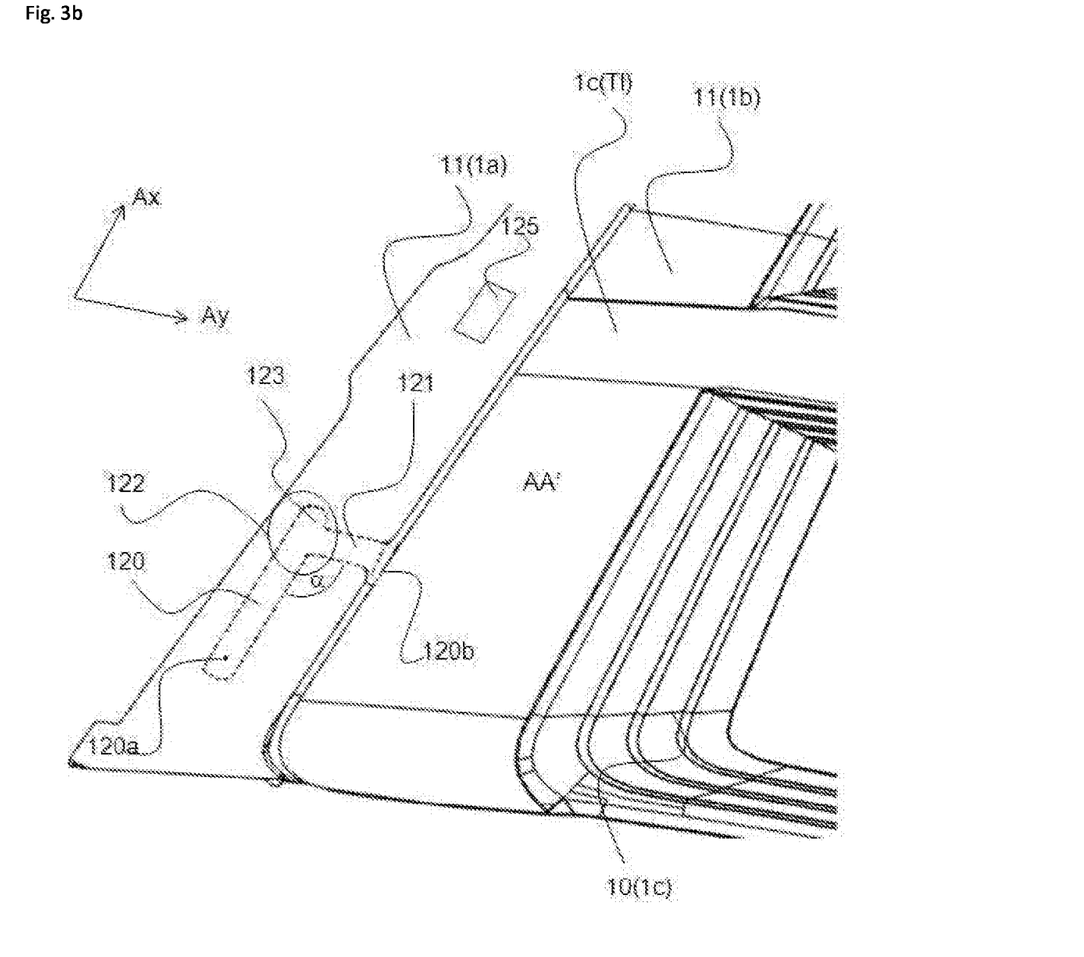
FIG. 3b shows a view of the material injection channel of FIG. 3a, said injection channel being overmolded, according to one nonlimiting embodiment.

In one nonlimiting embodiment, the material injection channel 12 is overmolded with the first material 1a which is opaque. As illustrated in FIG. 3b, the first material 1a covers the material injection channel 12. Thus, the latter will not be visible to the naked eye by an observer outside the vehicle. FIG. 3b illustrates the material injection channel 12 in dotted lines, which is covered by the first material 1b of the element 1. In one nonlimiting embodiment, the first material 1b incorporates a visibility window 125 which is made in the third material 1c. Thus, the light beam F which emerges through the second material 1b can also emerge through this visibility window 125.

In one nonlimiting embodiment, the material injection channel 12 comprises straight or rounded walls. In one nonlimiting embodiment, the injection point 120a is configured to perform an injection substantially perpendicular to the plane AA' of said element 1. This allows symmetrical filling of material in the secondary volume 11 at the same time as the injection into the primary volume 10.

In one nonlimiting embodiment, the first part 120 comprises a length L1 of more than 50 mm. This makes it possible to have enough volume so that the material has time to flow along the first part 120.

The first part 120 and the second part 121 extend in different directions Ax, Ay, which makes it possible to have a change of direction for the flow of the material which is injected into the material injection channel 12. This change of direction makes it possible to prevent the frosting from spreading in the second part 121 of the material injection channel 12 and consequently in the secondary volume 11. It is recalled that the frosting results in a set of localized or superimposed microbubbles which are distributed randomly around the injection point and the injection threshold and which can travel up to a distance of approximately 50 mm from an injection point. In addition to the frosting problem, the change of direction makes it possible to avoid a so-called free jet problem in the secondary volume 11. It is recalled that the free jet problem is manifested by a projection of an uncontrolled material front due to a pressure difference between the inlet and the outlet of the injection threshold, which leads to nonhomogeneous filling of the material, which is manifested by a serpentine appearance.

Figure 4:
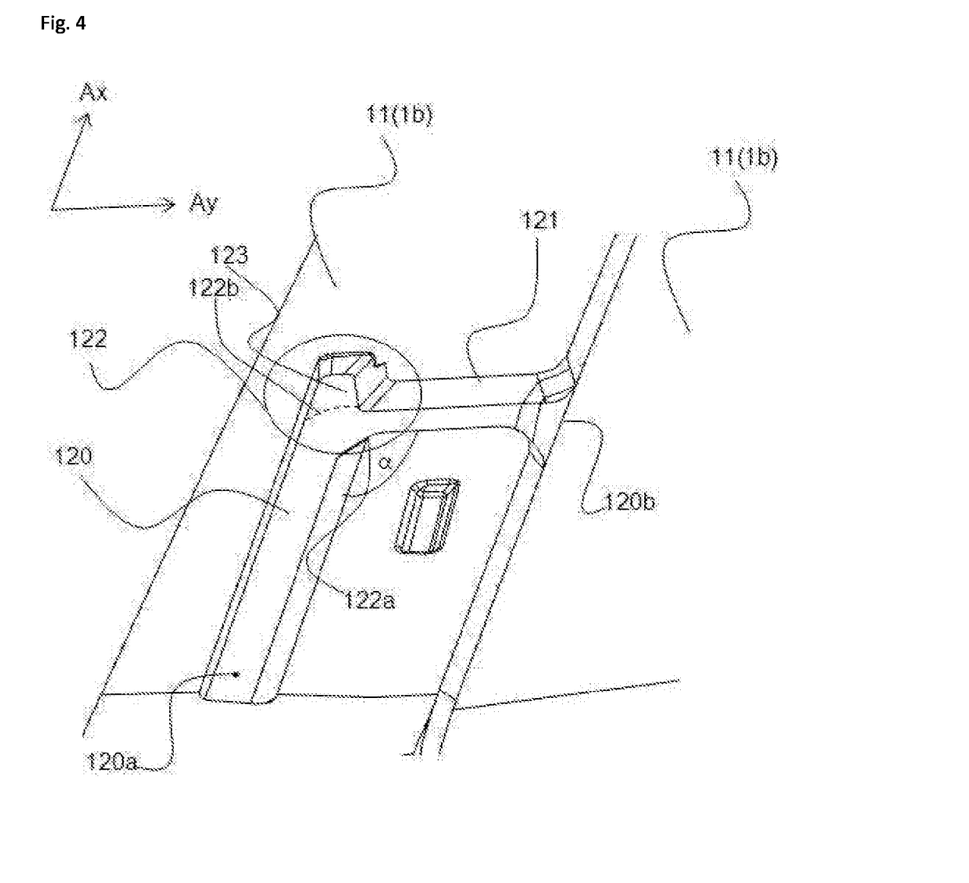
FIG. 4 shows a zoomed-in view of the material injection channel of the element of FIG. 3a, according to one nonlimiting embodiment.

As illustrated in FIG. 4, the bend 122 comprises an inner periphery 122*a* and an outer periphery 122*b* (illustrated in dotted lines in the figure). In one nonlimiting embodiment, the bend 122 includes an angle of approximately 90°. Thus, the first part 120 extends in a direction Ax, and the second part 121 extends in a direction Ay perpendicular to the first part 120. This makes it possible to control the flow of the material well. In another embodiment, the bend 122 includes an acute angle. In one nonlimiting embodiment, the bend 122 has a sharp angle as illustrated in FIG. 4 or is rounded as illustrated in FIG. 5.

In a first nonlimiting embodiment illustrated in FIG. 4, the element 1 comprises a single bend 122.

Figure 5:
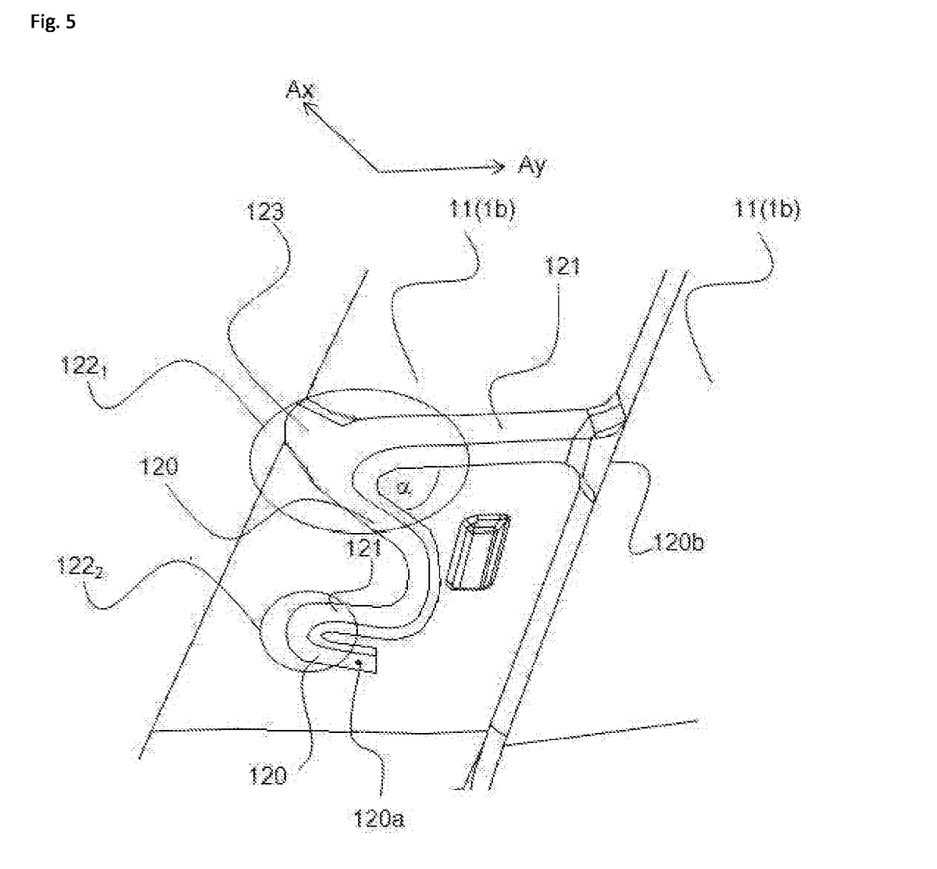
FIG. 5 shows a view of the material injection channel according to a second nonlimiting embodiment, said material injection channel forming part of said element of the luminous device of FIG. 1.

In a second nonlimiting embodiment illustrated in FIG. 5, the element 1 comprises two bends 122$_1$ and 122$_2$. This makes it possible to increase the volume in which the material flows, and therefore in which the frosting extends. A bend 122$_1$ comprises the protuberance 123. The other bend 122$_2$ does not comprise a protuberance.

The protuberance 123 is configured to trap the material injected into the material injection channel 12 which is under overpressure during the injection of the material via the injection point 120*a*, and which has the effect in particular of frosting. It is recalled that the injection via the material injection channel 12 represents the second injection for the element 1, namely that for the secondary volume 11 which is the smallest volume. The material which undergoes the overpressure is trapped in the protuberance 123 and remains stored in the protuberance; it cools and hardens; while the rest of the material continues to flow in the second part 121 of the material injection channel 12. It will be noted that the overpressure to which the injected material is subjected is limited in time. It lasts about 1.5 seconds. When the injection point 120*a* opens, the frosting defect propagates from the injection point 120*a* to the protuberance 123 and thus stops at the protuberance 123.

In nonlimiting embodiments, the protuberance 123 has a trapezoidal or hemispherical or rectangular cross section. In one nonlimiting embodiment illustrated in FIG. 4 and FIG. 5, the protuberance 123 extends over the outer periphery 122*b* respectively of the bend 122, 122$_1$.

It will be noted that, thanks to the material injection channel 12 comprising at least one bend 122 with a protuberance 123, it is thus possible to inject a material of the same color into two different volumes 11 and 10 of the same part, here the element 1.

Of course, the description of the invention is not limited to the embodiments described above and to the field described above. Thus, the element 1 can be made of any injected synthetic polymer material. Thus, in one nonlimiting embodiment, the protuberance 123 can have the shape of a droplet. Thus, in other nonlimiting embodiments, said element 1 is composed of a single layer, of two layers or of more than three layers. In one nonlimiting variant embodiment, when it is composed of a single layer or of two layers, the material injection channel 12 is in this case covered by an additional part of the luminous device 2, which makes it possible to make it invisible to the naked eye by an observer outside the vehicle. In the monolayer case, the layer is a layer of opaline color 1*b*. In the case of two layers, the two layers are a layer of opaline color 1*b* and a crystal layer 1*c*. Thus, in another nonlimiting embodiment, the primary volume 10 is equal to the secondary volume 11.

Thus, the described invention has in particular the following advantages:

it makes it possible, thanks to the protuberance 123, to trap the volume of material which is in overpressure upon the impact of the injection and which is injected into the injection point 120*a* of the smallest volume, here the secondary volume 11, of the element 1; the various problems of frosting, of whitish halos, or of a free jet, thus stop at the protuberance 123; these problems do not propagate into secondary volume 11, thanks also to the overmolding of the material injection channel 12, there is thus no longer any scrap with an appearance linked to the problem of frosting, of whitish halos, or of a free jet; the material injection channel 12 is completely hidden and integrated into the element 1, there is no light leak in the visibility window 125 when there is such a visibility window 125, it allows the use of a sequential material injection process on the same part, here the element 1.

What is claimed is:

1. An element of a vehicle luminous device made of synthetic polymer material comprising:
   an injection volume formed of a primary volume filled by a first injection point and a secondary volume;
   a material injection with at least two parts extending respectively in different directions, a first part of the at least two parts including a second injection point and a second part of the at least two parts connected to the secondary volume,
   at least one bend of variable angle connecting the at least two parts, with the at least one bend including a protuberance, and
   wherein the element is an intermediate screen.

2. The element as claimed in claim 1, wherein the at least one bend includes an angle of about 90°.

3. The element as claimed in claim 1, wherein the at least one bend is rounded.

4. The element as claimed in claim 1, wherein the second injection point is configured to perform an injection substantially perpendicular to a plane of the element.

5. The element as claimed in claim 1, wherein the primary volume and the secondary volume are separate.

6. The element as claimed in claim 1, wherein the protuberance has a trapezoidal cross section.

7. The element as claimed in claim 1, wherein the material injection channel is overmolded.

8. The element as claimed in claim 1, wherein the element is composed of one or more layers.

9. The element as claimed in claim 1, wherein the element is composed of three layers.

10. The element as claimed in claim 9, wherein one of the three layers is opaque and another of the three layers is transparent.

11. The element as claimed in claim 1, wherein the synthetic polymer material includes PMMA or PC.

12. The element as claimed in claim 1, wherein the element includes two bends.

13. The element as claimed in claim 1, wherein the at least one bend has a sharp angle.

14. The element as claimed in claim 1, wherein the primary volume and the secondary volume are edge to edge.

15. The element as claimed in claim 1, wherein the protuberance has a hemispherical cross section.

16. The element as claimed in claim 1, wherein the protuberance has a rectangular cross section.

17. A vehicle luminous device, the vehicle luminous device comprising at least one light source, an optical element, a transparent outer output lens and an intermediate screen, the intermediate screen including an injection volume formed of a primary volume filled by a first injection point and a secondary volume, a material injection with at least two parts extending respectively in different directions, a first part of the at least two parts including a second injection point and a second part of the at least two parts connected to the secondary volume, at least one bend of variable angle with a protuberance connecting the at least two parts, and arranged between the optical element and the transparent outer output lens.

18. The luminous device as claimed in claim 17, wherein the vehicle luminous device is a position light.

\* \* \* \* \*